W. H. GUTHRIE.
AUTOMATIC AIR CONTROLLING DEVICE FOR GAS ENGINES.
APPLICATION FILED OCT. 3, 1916.
1,230,481.
Patented June 19, 1917.
2 SHEETS—SHEET 1.
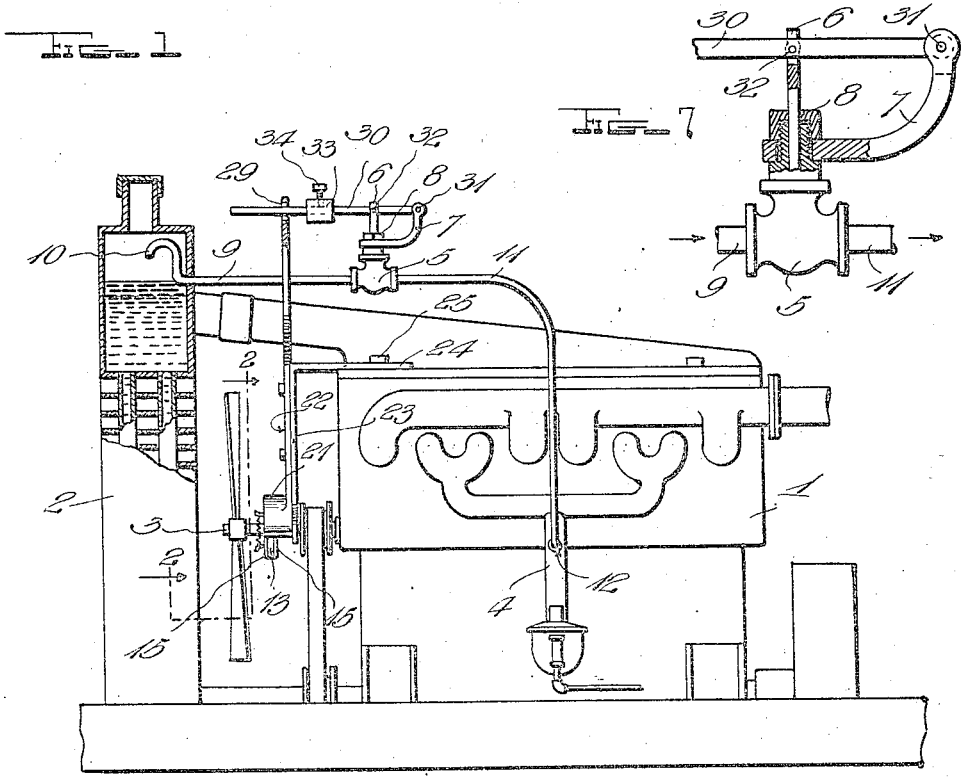
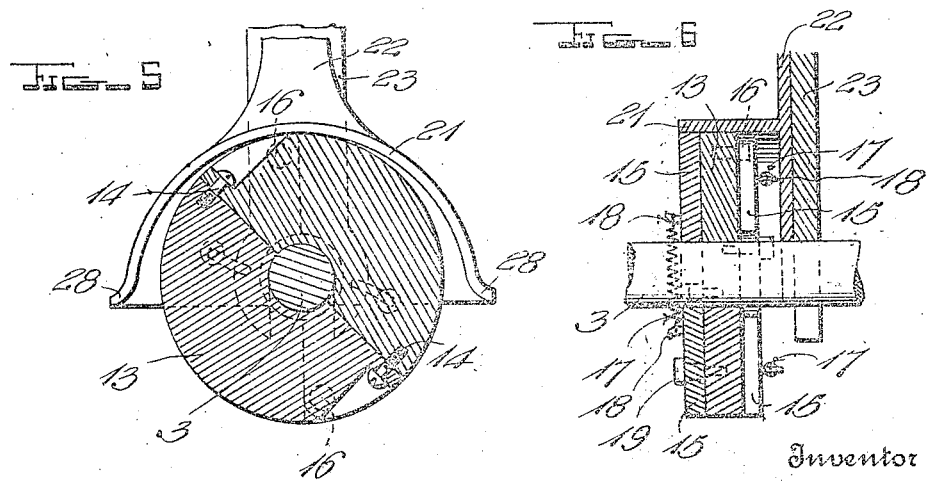
Witness
Inventor
W. H. Guthrie
By
Attorneys

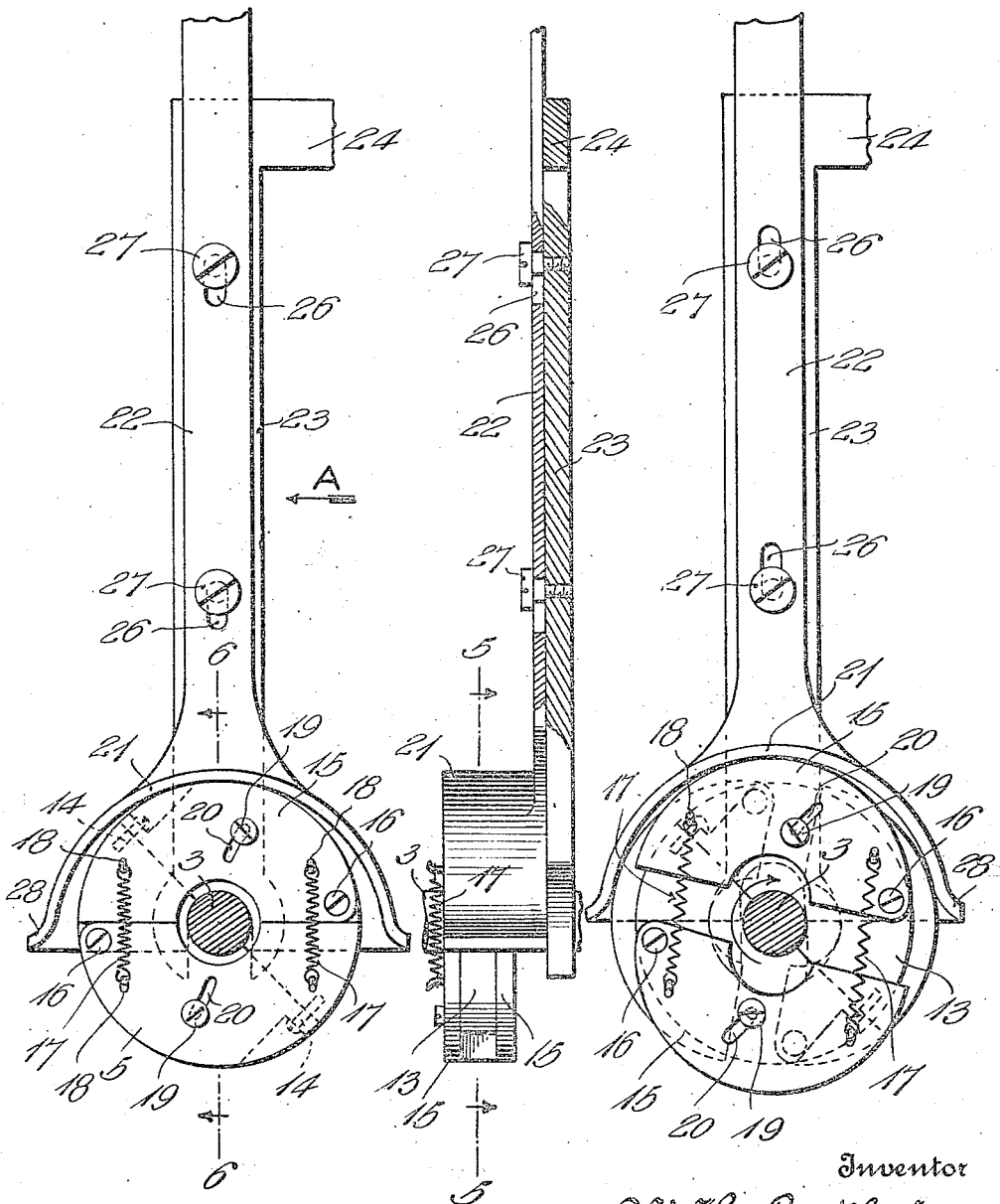

UNITED STATES PATENT OFFICE.

WADE H. GUTHRIE, OF CHARLESTON, WEST VIRGINIA.

AUTOMATIC AIR-CONTROLLING DEVICE FOR GAS-ENGINES.

1,230,481. Specification of Letters Patent. Patented June 19, 1917.

Application filed October 3, 1916. Serial No. 123,571.

*To all whom it may concern:*

Be it known that I, WADE H. GUTHRIE, a citizen of the United States, residing at Charleston, in the county of Kanawha and State of West Virginia, have invented certain new and useful Improvements in Automatic Air-Controlling Devices for Gas-Engines; and I do declare the following to be a full, clear, and exact description of the invention, such as will enable others skilled in the art to which it appertains to make and use the same.

This invention relates to automatic air controlling devices for gasolene or explosive engines and more particularly one in which the speed of an engine automatically controls the opening and closing of a valve arranged to admit air or steam from the top of an automobile radiator or other point to the intake manifold, thereby increasing the power and reducing the expense of operating the motor.

The object of the present invention is to provide a device of this character which is simple and inexpensive in construction and which may be quickly and easily applied to automobile or other engines.

With the above and other objects in view, the invention consists of certain novel features of construction and the combination and arrangements of parts as will be hereinafter more fully described and claimed.

In the accompanying drawings:

Figure 1 is a side elevation partly in section of a portion of an automobile engine showing the invention applied thereto;

Fig. 2 is a vertical section on an enlarged scale taken on the line 2—2 of Fig. 1;

Fig. 3 is a similar view with the parts in the position they assume when the speed of the engine reaches a predetermined point;

Fig. 4 is a side elevation of Fig. 2 looking in the direction of the arrow A; parts broken away and in section;

Figs. 5 and 6 are vertical sectional views taken on the lines 5—5 and 6—6 of Fig. 4 and Fig. 2 respectively; and Fig. 7 is a detail sectional view of the valve proper and adjacent parts.

In the accompanying drawings 1 denotes the automobile engine, 2 the radiator, 3 the usual cooling fan shaft which is driven by a belt or other means from the engine shaft, and 4 denotes the intake manifold of the engine.

In applying my invention to an automobile engine, I provide a suitable valve inclosed in a casing 5 provided with a slidable operating stem 6 which passes through a bracket 7 pivotally mounted on the top of the valve casing and held in position by a clamping nut 8. The valve casing 5 has connected to its inlet end a pipe 9 which in Fig. 1 is shown as extending into the upper portion of the automobile radiator 2 and having a downturned open end 10 to receive steam from the radiator, but it will be understood that said pipe 9 may lead to another source of steam supply or take in air heated or otherwise. To the outlet end of the valve casing 5 is connected a pipe 11 that is tapped into the intake manifold 4 at 12 or any other suitable point.

In order to automatically operate the valve stem 6 according to the speed of the engine I provide on the fan shaft 3, or any other driven part of the motor, a centrifugal governing device which consists of a sectional collar 13 preferably made in two half sections and secured together by screws 14 or the like so that the device may be readily applied to the shaft without removing any parts of the motor. Arranged on each side face of this stationary collar 13 which of course rotates with the fan shaft, is a pair of centrifugal weights 15 each of substantially semicircular shape and having their straight opposing edges notched to receive the shaft 3. The semicircular weights 15 of each pair have their opposite ends pivoted by screws or the like 16 to the collar 13 and they are drawn together by a pair of coiled springs 17 having eyes at their ends engaged with pins 18 arranged on the weights 15 as clearly shown in the drawings. These springs 17 draw the weights normally inward into contact so that their outer edges conform to the circumference of the collar 13 and the outward movement of said weights under centrifugal action is limited by providing in the collar stop screws 19 which extend through curved slots 20 concentric with the pivots 16. The two pairs of swinging weights 15 are arranged so that the pivots of one pair are 180° around the circle from the pivots of the other pair and as said weights fly outwardly through centrifugal force they engage and actuate a semicircular band 21 extending laterally from the lower end of a vertically sliding bar 22' mounted for movement in a guide 23 forming the lower portion of a bracket 24 which is secured at 25 by screws or the like to the motor top or any other suitable point. To guide the bar or member 22 it is formed with longitudinal slots 26 which receive guide screws 27 tapped into the guide portion 23 of the attaching bracket. The band 21 has its extremities 28 flared outwardly to prevent any possibility of the centrifugal members being caught on such ends as will be readily understood on reference to the drawings. The upper end of the bar or member 22 is provided with a loop or eye 29 which loosely receives the free end of a lever 30 which has its other end pivoted at 31 to the bracket or arm 7 on the valve casing 5. The intermediate portion of the lever 30 is pivoted at 32 to the valve stem 6 and beyond this pivot 32 is a slidable weight 33 adapted to be held in an adjusted position on the valve lever 30 by means of a set screw 34.

In operation when the speed of the engine reaches a predetermined point the weights 15 will fly outwardly against the tension of the springs 17 and the action of the weight 33 so that said weights will move the band 21 upwardly and thereby cause the eye 29 at the upper end of the bar 22 to lift the valve lever 30 and thereby open the valve in the casing 5 to permit steam to pass from the top of the radiator into the intake manifold of the engine. The time of opening of the controlling valve in the casing 5 can be regulated by adjusting the weight 33 on the lever 30 as will be readily understood. As the speed of the engine decreases the weight 33 and the springs 17 will return the parts to their normal position. It will thus be seen that the device is entirely automatic in operation and while I have shown it in the drawings as controlling the flow of steam from the radiator to the intake manifold it will be understood that it may be used for supplying steam or air from any source.

Various changes in the form, proportion and the minor details of construction may be resorted to without departing from the principle or sacrificing any of the advantages of the claimed invention.

I claim:

1. The combination with a shaft driven by an explosive engine, a collar fixed to said shaft, centrifugally acting weights mounted on said collar, a sliding member having an enlarged lower end with a laterally projecting flange formed thereon and semi-circular in shape with flared ends, said flange being adapted to engage the edge of the collar and to be actuated by the weights, the radius of the flange being greater than the radius of the collar, and a valve operated by said sliding member for controlling the inlet into the intake manifold of the engine.

2. The combination of a shaft driven by an explosive engine, a collar fixed to said shaft, centrifugally acting weights mounted on said collar, a sliding member carrying a curved element to rest on and be actuated by said weights, a valve to control an inlet into the intake manifold of an engine, a lever for operating said valve, an adjustable weight on said lever, loose connections between said lever and said sliding member, and springs for actuating said centrifugal weights inwardly toward the axis of said shaft.

3. The combination with a shaft driven by an explosive engine, a bracket having one end secured to the engine and its other end straddling the shaft, a collar fixed to said shaft, centrifugally acting weights on said collar, a strip slidably mounted on said bracket, the lower end of said strip being enlarged and adapted to straddle the driven shaft, a semi-circular flange projecting from said enlarged end of the strip and adapted to rest on and be actuated by said weights, a valve to control the inlet into the intake manifold of the engine, and a lever for operating said valve extending through an opening in the upper end of the movable strip and operable upon movement of said strip.

In testimony whereof I have hereunto set my hand in the presence of two subscribing witnesses.

WADE H. GUTHRIE.

Witnesses:
J. A. GRIESBAUER,
C. E. HUNT.